US006944141B1

(12) United States Patent
Yen

(10) Patent No.: US 6,944,141 B1
(45) Date of Patent: Sep. 13, 2005

(54) SYSTEMS AND METHOD FOR PHASE MULTIPLEXING IN ASSIGNING FREQUENCY CHANNELS FOR A WIRELESS COMMUNICATION NETWORK

(75) Inventor: Wen-Kai Yen, Alpharetta, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/425,644

(22) Filed: Oct. 22, 1999

(51) Int. Cl.[7] ............................. H04Q 7/20; H04Q 7/00
(52) U.S. Cl. ...................... 370/330; 370/329; 370/252; 455/434
(58) Field of Search ................................ 370/330, 350, 370/329, 252; 455/434, 450, 67.1, 67.3, 226.1, 455/63.1; 375/279, 283, 141, 259, 260, 220, 375/362

(56) References Cited

U.S. PATENT DOCUMENTS

| | | | | | |
|---|---|---|---|---|---|
| 3,914,695 | A | * | 10/1975 | Giusto ........................ | 375/308 |
| 5,199,031 | A | * | 3/1993 | Dahlin ....................... | 370/329 |
| 5,729,531 | A | * | 3/1998 | Raith et al. ................. | 370/252 |
| 6,314,084 | B1 | * | 11/2001 | Kahale et al. ............. | 455/63.1 |

* cited by examiner

Primary Examiner—Edward F. Urban
Assistant Examiner—Lana Le

(57) ABSTRACT

The present invention provides for a modulation control device and method that can be implemented economically in existing communication networks or new networks to increase capacity. A modulation control device in accordance with the present invention allows for possibly more than one call to simultaneously utilize the same frequency channel for AMPS systems or the same frequency during the same timeslot for TDMA systems. A modulation control device in accordance with the present invention evaluates the transmission quality of a frequency channel and if acceptable, the modulation control device phase divides the frequency channel. The modulation control device assigns phase adjustment values to a call preferably which remain independent of the information encoding modulation techniques utilized. A call then can be modulated by the assigned phase adjustment value during transmission, and the call may be identified by the assigned phase adjustment value during reception. The present invention further provides a methodology for modulating calls by varying phase to increase capacity in wireless communication networks.

26 Claims, 12 Drawing Sheets

US 6,944,141 B1

SYSTEMS AND METHOD FOR PHASE MULTIPLEXING IN ASSIGNING FREQUENCY CHANNELS FOR A WIRELESS COMMUNICATION NETWORK

FIELD OF THE INVENTION

The present invention generally relates to wireless communication networks, and more particularly to increasing the capacity of wireless communication networks.

BACKGROUND OF THE INVENTION

In recent years, the popularity and growth of wireless communication networks has increased in dramatic fashion. In fact, wireless networks are continually pressed to keep up with the demands for increased capacity while maintaining reliable and acceptable service. Steps are continuously being taken to increase capacity in existing networks, but the demand for more capacity remains because of the tremendous growth in wireless communications.

Traditional wireless communication networks are partitioned into service areas known as cells wherein mobile units within a cell communicate via radio links with a base station that services that cell. The base station is coupled to the public switch telephone network for access to the land network. A pool of available frequency channels is assigned to each cell in such a way that the same frequency channels can be reused in other cells that are sufficiently separated by enough distance to prevent unacceptable co-channel interference. These frequency channel re-use patterns can be implemented with assumptions that include equal-sized, regularly spaced cells with uniformly distributed traffic loads. The re-use patterns can also be adjusted to increase capacity based on real world considerations such as usage patterns and topography to increase capacity. The design and operation of a typical wireless communication network is described in an article titled "Advanced Mobile Phone Service" by Belcher, IEEE Transactions on Vehicular Technology, Vol. VT29, No. 2, May 1980, pp. 238–244.

Attempts at further increasing capacity for digital wireless networks have included using a Code Division Multiple Access (CDMA) architecture based on the IS-95 digital wireless standard. IS-95 refers to the standard set by the Electronics Industries Association (EIA) and the Telecommunications Industries Association (TIA) for the implementation of a CDMA architecture. In CDMA systems, a unique code is allocated to each mobile unit and all calls are communicated simultaneously over a broad band of frequency, i.e., 1.25 MHz for IS-95, thus spreading the energy of the calls over a large bandwidth. The calls are decoded by using the knowledge of the unique code of a mobile unit to retrieve a particular call.

Further attempts to increase capacity for wireless communication networks have been implemented by using a Time Division Multiple Access (TDMA) architecture. TDMA is an implementation that allows multiple calls to use a shared frequency channel by using different time slots. Standards have been set by the Electronics Industries Association (EIA) and the Telecommunications Industries Association (TIA) for the implementation of a TDMA architecture following EIA/TIA documents IS-54/IS-136. The European digital wireless network, referred to as Global System for Mobile Communications (GSM), also uses a TDMA architecture. The frequency channel is divided into timeslots with each mobile unit being assigned at least one timeslot during which it can communicate with the base station. For IS-54/IS-136 each frequency channel is allocated 30 kHz of bandwidth which is divided into six timeslots. For full rate operation, each mobile unit is assigned two of the six timeslots of the frequency channel. For half rate operation, each mobile unit is assigned only one timeslot.

A technique to increase capacity over traditional TDMA is called Enhanced Time Division Multiple Access (E-TDMA) which dynamically allocates timeslots to mobile units thereby taking advantage of the dead space that results from one-way alternating conversations and the redundant nature of human speech. Accordingly, mobile units are not assigned permanent timeslots for the call duration but receive timeslots for communicating only when needed. However, E-TDMA is complex in design, and therefore, difficult if not impractical to implement. The cost of an E-TDMA system is yet another impediment to its acceptance.

The growth of existing wireless communication networks is threatened by the capacity restraints of the networks. The use of more cells is costly because of the additional base stations needed and the problems of securing additional base station sites. Also, many existing wireless communication providers are already heavily invested in equipment for specific architectures so converting to another architecture is not a commercially viable option. Therefore, it would be desirable to be able to further increase capacity efficiently, economically, and without degrading service of existing wireless communication networks. It is also desirable to give new wireless communication providers a broader array of choices when equipment and capacity concerns are addressed.

SUMMARY OF THE INVENTION

The present invention provides for modulation control devices and methods that can be implemented economically in existing and new wireless communication networks to increase capacity. A modulation control device in accordance with the present invention evaluates the transmission quality of a frequency channel and if acceptable, the modulation control device phase divides the frequency channel. For example, a modulation control device in accordance with the present invention allows for possibly more than one call to simultaneously utilize the same frequency channel for AMPS networks or the same frequency during the same timeslot for TDMA networks via phase modulation.

The modulation control device assigns phase adjustment values to a call preferably which remain independent of the information encoding modulation techniques utilized. A call then can be modulated by the assigned phase adjustment value during transmission, and the call may be identified by the assigned phase adjustment value during reception. The present invention further provides methodologies for modulating calls by varying phase to increase capacity in wireless communication networks.

In accordance with an aspect of the present invention, a system for assigning a call to one of a plurality of wireless frequency channels in a wireless communication network comprises a wireless transceiver and a modulation control device that identifies a frequency channel for the call to utilize. The modulation control device then transfers at least one assignment modulation parameter, at least including phase, to the transceiver for assigning the call to the frequency channel. When the modulation control device transfers modulation parameters including frequency channel and phase to the transceiver, then the wireless communication network can include advanced mobile phone system (AMPS) wireless networks. When the modulation control device transfers modulation parameters including timeslot and frequency as well as phase to the transceiver, then the wireless communication networks can include time division multiple access (TDMA) wireless networks including personal communications system (PCS) networks or global system for mobile communications (GSM) networks.

A modulation control device in accordance with the present invention can include a threshold detector that measures a transmission quality of frequency channels and a modulation control mechanism that selects available frequency channels based on the transmission quality measurements. The threshold detector may be configured to measure transmission quality of a frequency channel during the different timeslots. The modulation control mechanism may also include logic to select phase adjustment values or to retain predetermined phase adjustment values. The modulation control mechanism may include logic that can select the phase adjustment values so as to maximize the phase separation between calls on the frequency channel. Additionally, the modulation control mechanism may include logic that selects phase adjustment values that provide a unique resultant phase value for the calls.

The present invention also provides for mobile units capable of receiving calls that have been transmitted using phase adjustment values. These mobile units may each include a mobile modulation control device that uses a phase adjustment value received from the base station to receive calls from the base station and to transmit calls to the base station.

The present invention also calls for and can be conceptualized as methods for use in a wireless communication network for assigning calls to frequency channels. In one embodiment of this methodology a step of assigning a frequency channel and a phase adjustment value to a call is included. The phase adjustment value is then communicated to the mobile unit that is associated with the call so that the mobile unit can use the phase adjustment value for transmitting the call and reference the phase adjustment value for receiving the call. A variation of this methodology includes the step of measuring the transmission quality of the frequency channels individually before a frequency channel is assigned to a call. If the transmission quality of a frequency channel exceeds a predetermined value, then the call can be assigned to that frequency channel as above.

The present invention also calls for and can be conceptualized as methods for allocating calls in a wireless communication network that uses TDMA technology. For example, a transmission quality of the frequency channels can be individually measured during each timeslot. If the transmission quality of a frequency channel during a timeslot exceeds a predetermined value, then the call can be assigned to the frequency channel for that timeslot and assigned a phase adjustment value in accordance with an embodiment of the invention. This phase adjustment value is communicated to the mobile unit that is associated with the call. Likewise, the base station associates the phase adjustment value with the call so that the phase adjustment value can be used for transmitting the call to the mobile unit and referenced for receiving the call from the mobile unit.

The present invention also calls for and can be conceptualized as methods for use by a mobile unit for receiving calls which are transmitted with a phase adjustment value. This method includes the steps of receiving a phase adjustment value from the base station that identifies, at least in part, a call and demodulating the call through utilizing the phase adjustment value. This method may also include the step of filtering out noise if necessary. The present invention also calls for and can be conceptualized as methods for use by a mobile unit to transmit calls which have been assigned a phase adjustment value. This method includes the steps of the mobile unit receiving a phase adjustment value from the base station for a call, and the mobile unit using the phase adjustment value for transmitting the call to the base station.

Other features and advantages of the present invention will become apparent to one with skill in the art upon examination of the following drawings and detailed description. It is intended that all such additional features and advantages be included herein in the scope of the present invention, as defined by the claims.

DESCRIPTION OF PREFERRED EMBODIMENTS

The present invention will now be described more fully hereinafter with reference to the accompanying drawings, in which preferred embodiments of the invention are shown.

This invention may, however, be embodied in different forms and should not be construed as limited to the embodiments as set forth herein. Rather, these embodiments are provided so that this disclosure will be thorough and complete, and will fully convey the scope of the invention to those skilled in the art. The elements of the drawings are not necessarily to scale, emphasis instead being placed upon clearly illustrating the principles of the present invention. Furthermore, like reference numbers refer to like elements throughout. This description includes a general overview of wireless communication networks, a first preferred embodiment, which is suitable for an AMPS system, and a second preferred embodiment which is suitable for IS-54/IS-136 TDMA systems.

Figure 1:
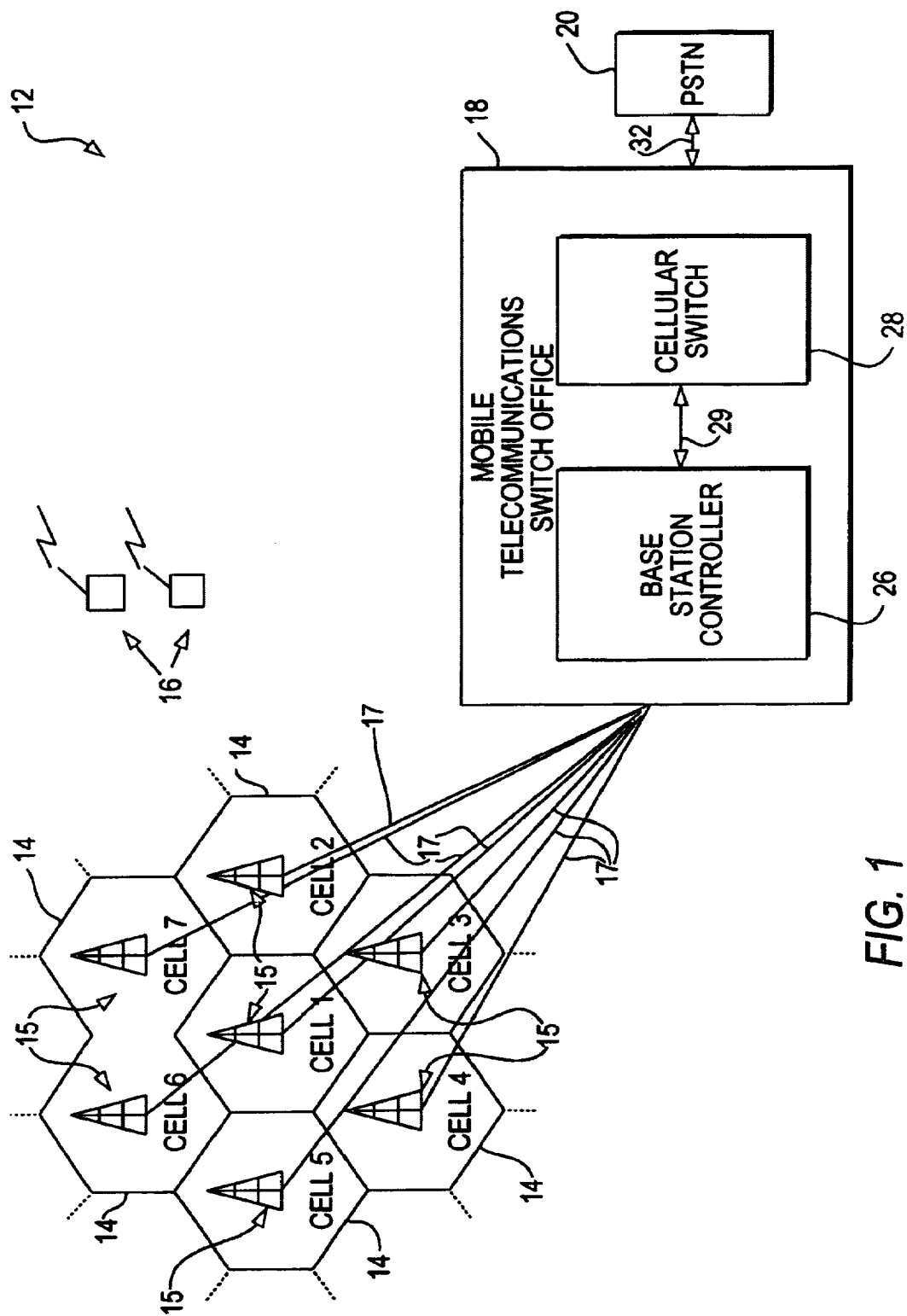
FIG. 1 is a block diagram of a wireless communication network suitable for employing an embodiment of the present invention.

With reference now to the drawings, FIG. 1 shows a wireless communication network 12 suitable for employing the present invention. The wireless communication network 12 includes a plurality of cells 14 configured to cover a particular geographic area, as well known in the art. It should be understood that the shape and configuration of the cells 14 are merely exemplary of that which is commonly used in the industry, and does not constitute any part of the invention. The cells 14 in FIG. 1 are configured in a seven cell repeating pattern with each cell having one-seventh of the total number of channels of the wireless communication network 12. In today's North America wireless network, there are typically 420 channels reused in each seven cell pattern. Accordingly, each cell 14 has sixty channels allotted to it. At each cell 14 is a base station 15 that provides a radio interface with a plurality of mobile units 16. A carrier facility 17 interconnects each base station 15 to a mobile telecommunications switching office (MTSO) 18. Each carrier facility 17 comprises a transmission media suited for transmitting a signal from each respective base station 15 to the MTSO 18. The MTSO 18 interconnects the wireless portion of the wireless communication network 12 to the public switch telephone network (PSTN) 20.

In addition, the MTSO 18 may include a base station controller 26 and a wireless switch 28 that are interconnected by a link 29. The base station controller 26 essentially interfaces the wireless portion of the network 12 with the wireless switch 28. The base station controller 26 performs the mobility management functions of the MTSO 18, for instance, channel routing functions and handoff functions. Thus, the wireless switch 28 is kept insulated from changes in a call arising from the mobility of the customer or arising from bandwidth management (i.e., hand-offs initiated by the base station controller 26 for bandwidth utilization between cells). The wireless switch 28 interfaces with the PSTN 20 via a link 32 that may include links to a variety of long distance exchange carriers and/or a local exchange carrier, as is well known in the art.

In a preferred embodiment, the present invention modifies base stations 15 to increase the capacity of the wireless communication network 12. Note, however, that the present invention may be implemented at the base stations 15 located at the cells 14 or in the MTSO 18 or in the base station controller 26 or distributed between different elements of the wireless communication network 12.

Figure 2A:
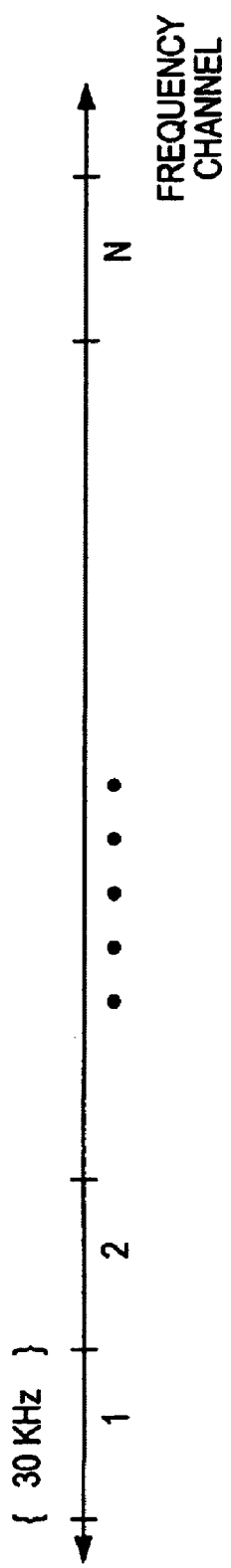
FIG. 2A provides a dimensional representation of the operation of an Advanced Mobile Phone Service wireless communication network according to prior art.
Figure 2B:
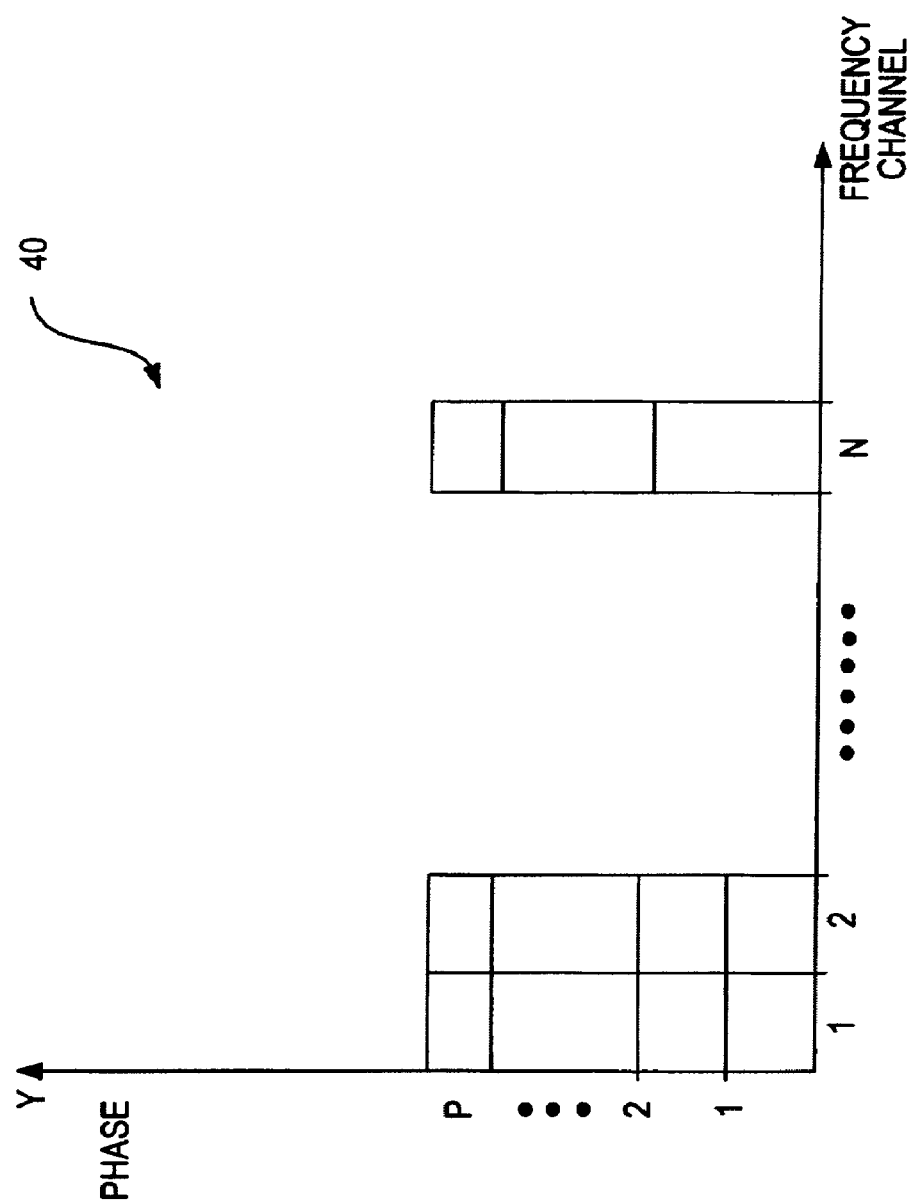
FIG. 2B provides a dimensional representation of the operation of an Advanced Mobile Phone Service wireless communication network in accordance with an embodiment of the present invention.

I. Implementation of a Modulation Control Device According to the Present Invention for AMPS Advanced Mobile Phone System (AMPS) is a well known way to implement a wireless communication network. AMPS provides multiple access by dividing a frequency block typically into 30 kHz frequency channels. Accordingly, multiple access in such a system is based upon the single dimension of frequency as illustrated in FIG. 2A. In accordance with the present invention, access to multiple users would be governed by two dimensions (frequency and phase) as illustrated by the two dimensional system 40 in FIG. 2B. This added dimension may allow for as many as P times more users than with mere frequency division, where P is the number of different phase adjustment values chosen to allocate the calls. While theoretically unlimited, the number of phase adjustment values possible is limited as a practical matter by the physical limits of the frequency channel (e.g., the noise of the frequency channel and the ability to recover the signals). A typical implementation might use four phase adjustment values.

AMPS uses frequency shift keying (FSK) for encoding information onto the carrier frequency. Therefore, the phase adjustment values can be chosen to maximize phase separation between the phase adjustment values without concerns over confusion that might result if the information was encoded by phase.

Figure 3:
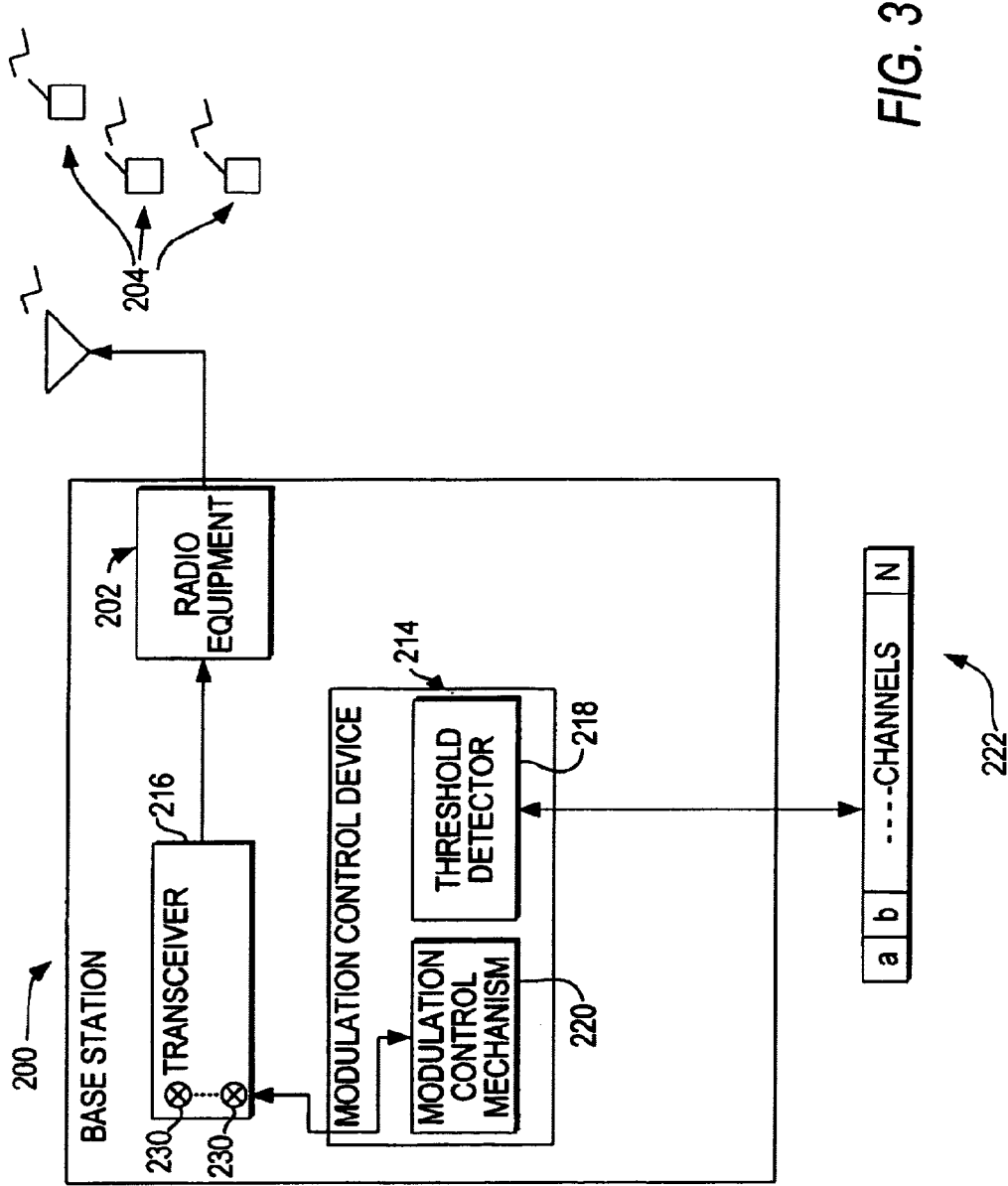
FIG. 3 is a schematic block diagram illustrating a base station for an Advanced Mobile Phone Service wireless communication network in accordance with an embodiment of the present invention.

Now referring to FIG. 3, illustrated is a base station 200 in accordance with an embodiment of the present invention in which the base station 200 uses radio equipment 202 for interfacing with at least one mobile unit 204. The base station 200 further includes a modulation control device 214 and a transceiver 216. The modulation control device 214 is communicatively connected to the transceiver 216.

The modulation control device 214 comprises a threshold detector 218 and a modulation control mechanism 220. The threshold detector 218 is configured to measure the transmission quality (the signal quality and noise) of a plurality of frequency channels 222 and to deliver these measurements to the modulation control mechanism 220.

This implementation begins with a first mobile unit 204 requesting initial service from the base station 200 for a call. The modulation control mechanism 220 compares the transmission quality measurements, taken by the threshold detector 218, of a first frequency channel 222 with a predetermined threshold level. If the measured transmission quality of the first frequency channel 222 is greater than the predetermined threshold level, then the modulation control mechanism 220 assigns the first frequency channel 222 and a phase adjustment value to the call of the mobile unit 204, and retains these assignment parameters (i.e., the phase adjustment value and the identity of the frequency channel to which the call was assigned). Otherwise, the modulation control mechanism 220 compares the transmission quality of a second frequency channel 222 with the predetermined threshold level. If the measured transmission quality of the second frequency channel 222 is greater than the predetermined threshold level, then the modulation control mechanism 220 assigns the second frequency channel 222 and a phase adjustment value to the call of the mobile unit 204 as shown above. If not, then the modulation control mechanism 220 will continue through the plurality of frequency channels 222 until the call can be assigned to a frequency channel 222 (i.e., until a frequency channel's quality measurement exceed the predetermined level). Once a last frequency channel 222 of the plurality of frequency channels 222 has been reached, the modulation control mechanism 220 returns to the first frequency channel 222 of the plurality of frequency channels 222 and increments the phase adjustment value to the next phase value. Once a last frequency channel 222 of the plurality of frequency channels 222 has been reached and the last phase adjustment value of a plurality of such values has been reached, the modulation control mechanism 220 returns to the first frequency channel 222 and resets the phase adjustment value to the initial phase value.

When any subsequent mobile unit 204 requests service from the base station 200 for a call, the modulation control mechanism 220 identifies a frequency channel 222 and phase adjustment value for the call in substantially the same manner as described above except that the modulation control mechanism 220 begins with the phase adjustment value of the previous assigned call and with the next frequency channel 222 after the frequency channel 222 to which the previous call was assigned.

Once the frequency channel 222 and the phase adjustment value has been assigned to the call of the mobile unit 204, then the frequency channel and phase adjustment value assigned may be communicated to the mobile unit 204 over the control channel, as is well known in the art.

When the base station 200 is transmitting to the first mobile unit 204, the modulation control mechanism 220 may communicate with the transceiver 216, wherein the transceiver 216 may include a plurality of modulators/demodulators 230. The modulation control mechanism 220 can communicate the frequency channel 222 and phase adjustment value for the first mobile unit 204 for the call to the transceiver 216 so that at least one of the plurality of modulators/demodulators 230 can modulate the call based on these assignment parameters. Let $A(t)\cos(2\pi k(\text{frequency channel assigned}(t))+\text{phase adjustment value})$ represent the waveform produced by at least one of the plurality of modulators/demodulators 230 where k represents the variable to control the information encoding for FSK. The waveform illustrates the phase division of an information carrying signal on a frequency channel. Note that for each additional phase adjustment value utilized an additional modulators/demodulators may be required for each frequency channel.

Alternatively, the modulation control device 214 may interact with the base station controller 26 to accomplish the phase adjustment value modulation so that the mobile unit 204 can identify the transmission. Yet another alternative is that the modulation control device 214 may communicate with a modulator/demodulator that is independent of the transceiver 216 to modulate the call with the associated phase adjustment value for the mobile unit 204. Additional modulators/demodulators to modulate the call with the associated phase adjustment value can be added to existing base stations 200 to facilitate the implementation of this embodiment of the present invention.

When the base station 200 receives transmissions during a call from a mobile unit 204, the transceiver 216 may communicate with the modulation control mechanism 220 to allow identification of the mobile unit 204. For example, after the received transmission during a call is demodulated, the modulation control mechanism 220 may compare the phase of the signal with the assigned phase adjustment value to identify the mobile unit 204 that made the transmission.

Figure 4:
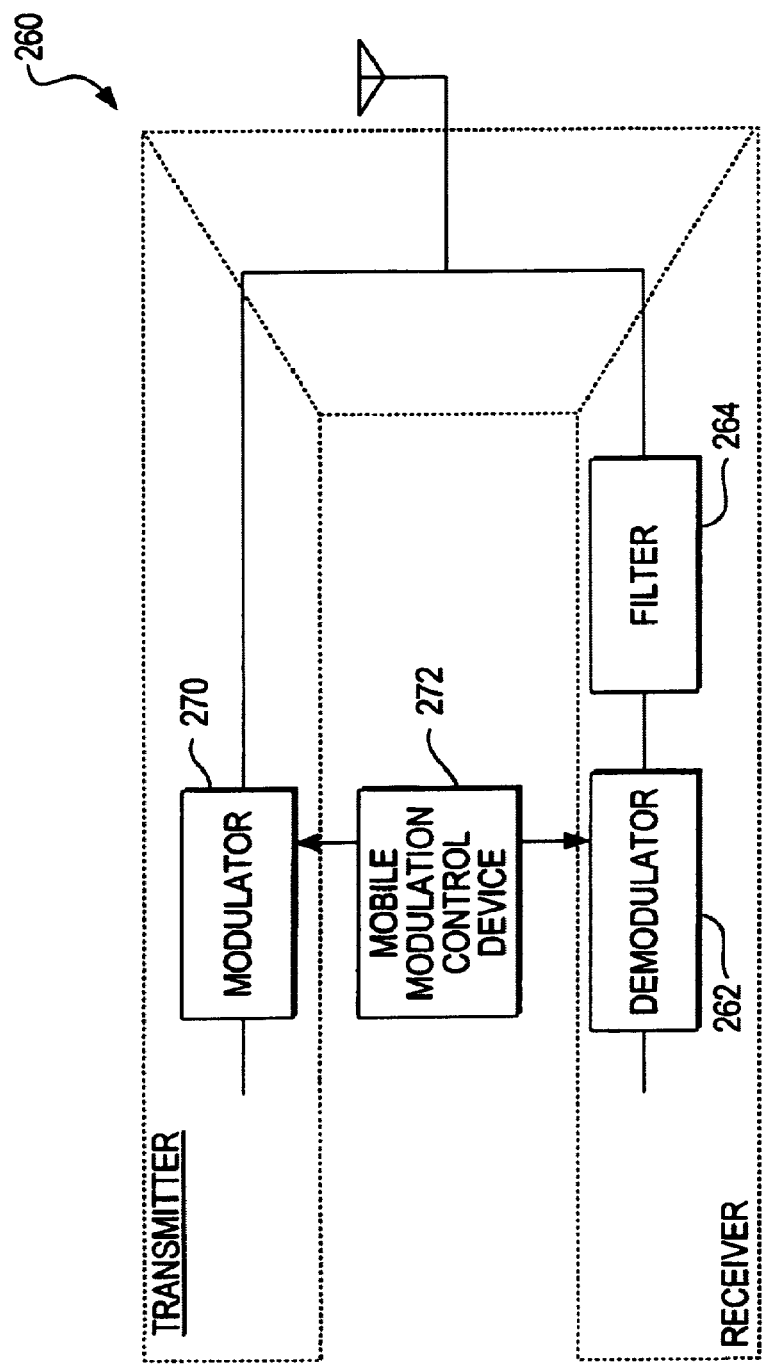
FIG. 4 is a schematic block diagram illustrating a mobile unit for an Advanced Mobile Phone Service wireless communication network in accordance with an embodiment of the present invention.

FIG. 4 illustrates some of the elements of a mobile unit 260 for use in accordance with an embodiment of the present invention. The mobile unit 260 includes a demodulator 262, a filter 264, a modulator 270, and a mobile modulation control device 272. When the mobile unit 260 receives the assigned frequency channel 222 and phase adjustment value from the base station 200 for the call, these values are retained by the mobile modulation control device 272 for the duration of the call of the mobile unit 204. When the mobile unit 204 receives a transmission from the base station 200 the mobile modulation control device 272 communicates the assigned phase adjustment value to the demodulator 262. Therefore, the call can be demodulated using the phase adjustment value. The demodulator's 262 output may then be passed to the filter 264 to remove the noise and retrieve the desired transmission from the base station 200 for the call. When the mobile unit 204 wishes to transmit, the mobile modulation control device 272 may communicate the assigned phase adjustment value and frequency channel to the modulator 270. Accordingly, the mobile unit 260 transmits a signal with the assigned phase adjustment value which allows the base station 200 to identify which mobile unit 204 made the transmission and accordingly to which call the transmission belongs.

Figure 5A:
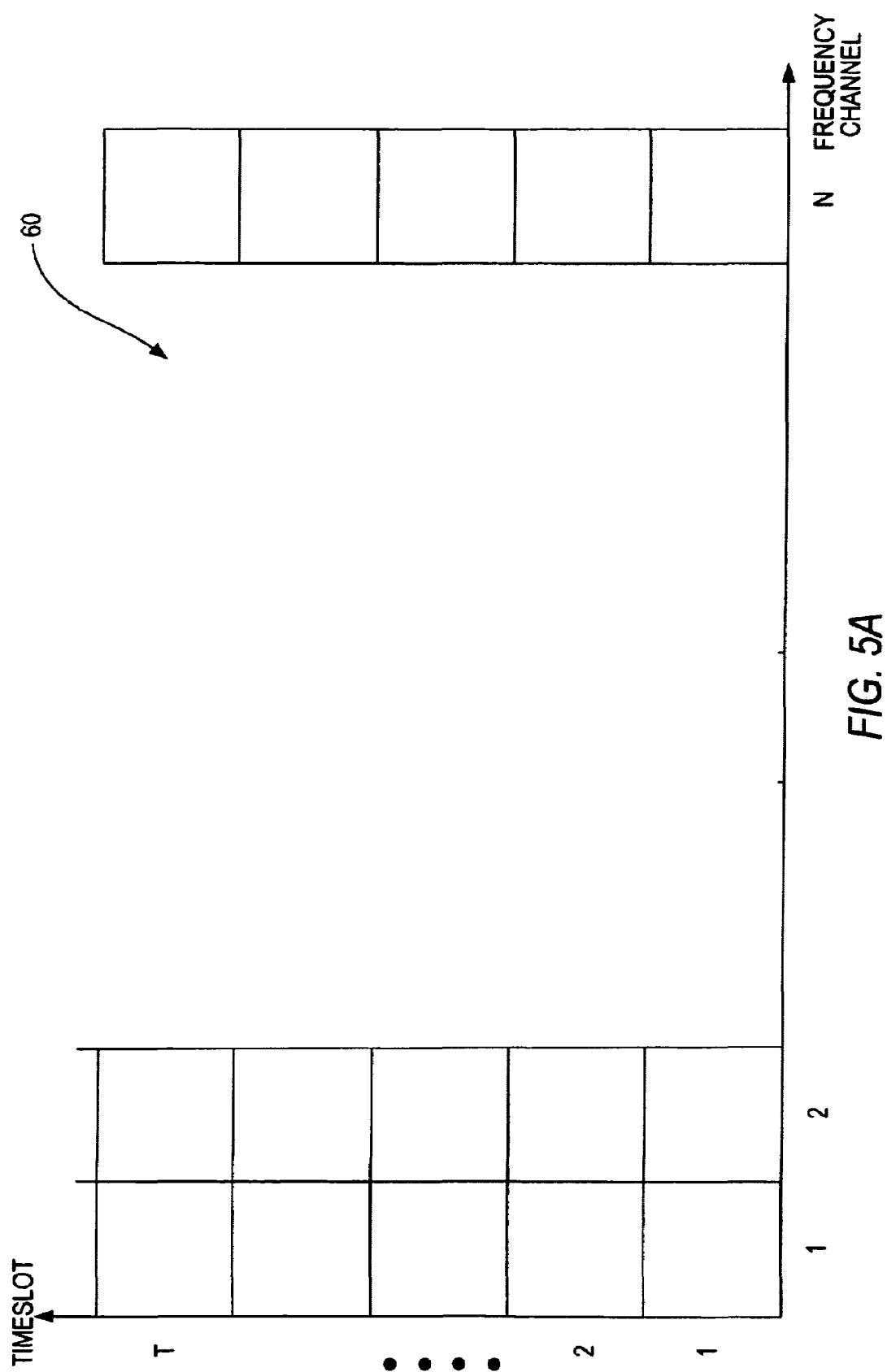
FIG. 5A provides a dimensional representation of the operation of a Time Division Multiple Access wireless communication network according to prior art.
Figure 5B:
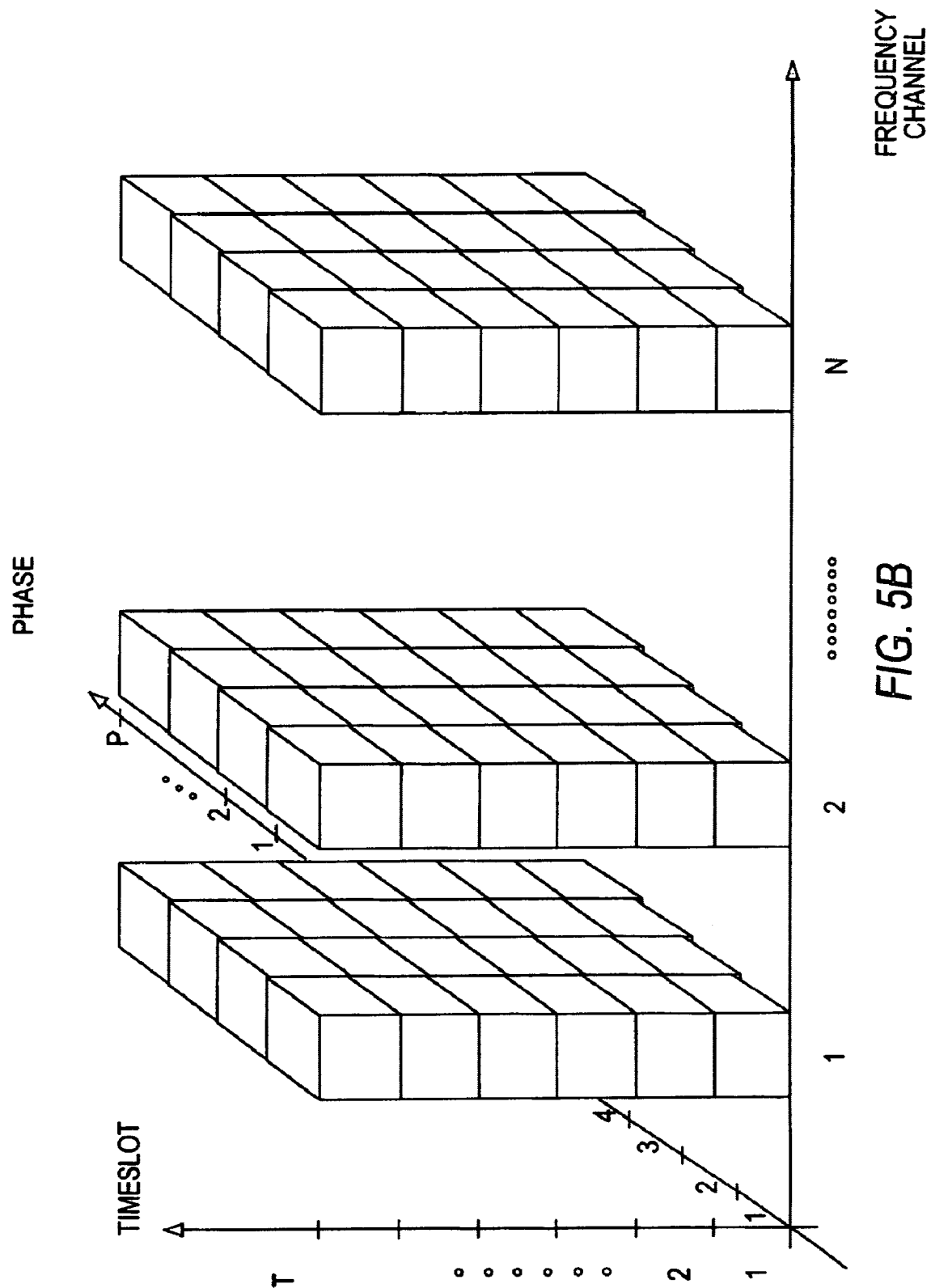
FIG. 5B provides a dimensional representation of the operation of a Time Division Multiple Access wireless communication network in accordance with an embodiment of the present invention.

II. Implementation of a Modulation Control Device According to the Present Invention for TDMA A second preferred embodiment of the present invention is for use in TDMA systems. TDMA systems, wherein a frequency channel is divided into timeslots, include systems in the cellular frequency bands, GSM frequency bands, and PCS frequency bands. The IS-54/IS-136 standard which governs TDMA cellular systems divides a 30 kHz cellular channels into six timeslots. Accordingly, calls are assigned to a frequency channel for use during certain timeslots. This two dimensional multiple access system (timeslot and frequency channel) is illustrated by the two dimensional system 60 in FIG. 5A. In accordance with the present invention, access to multiple users would be governed by three dimensions for TDMA (frequency, timeslot, and phase) as illustrated by the three dimensional system 70 in FIG. 5B. Accordingly, an embodiment of the present invention may require three dimensions to assign and identify a call in the network.

The IS-54/IS-136 standard which governs TDMA 800 MHz cellular systems and 1900 MHz PCS systems uses π/4 differential quaternary phase shift keying (π/4-DQPSK), which is a modulation technique well known in the art, to encode information onto the carrier wave. This modulation technique, π/4-DQPSK, encodes information by varying the phase of the carrier wave. The present invention adjusts the phase to allow multiplexing of calls for transmission on the same frequency channel during the same timeslot. Accordingly, care should be taken in choosing the phase adjustment values to ensure that the aggregate of the information encoding phase and the phase adjustment value is unique. If the phase adjustment values are chosen poorly, then it would be possible that a call with an phase adjustment value of A and an information encoding phase of B would have the same aggregate phase as a call with an phase adjustment value of C and an information encoding phase of D when A+B equals C+D.

For π/4-DQPSK modulation, the information is conveyed by referencing the previous phase and the current phase; the phase of the carrier wave should be π/4 or some multiple thereof. One possible way to choose the phase adjustment values so that the aggregate phase values are unique is by the use of prime numbers.

Note the following example for use with π/4-DQPSK modulation. Let P represent the number of levels (different phase values chosen) of phase for assigning a call. As stated before, a typical implementation might use four levels (P=4). Let M represent the smallest prime number that is larger than P. The phase adjustment values can then be chosen with the aid of the following formula:

$$\text{phase adjustment value}_P = p\left(\frac{2\pi}{M}\right) \text{ where } p = 1 \text{ to } P.$$

Accordingly, the phase adjustment values for π/4-DQPSK could be 2π/5, 4π/5, 6π/5, and 8π/5.

Figure 6:
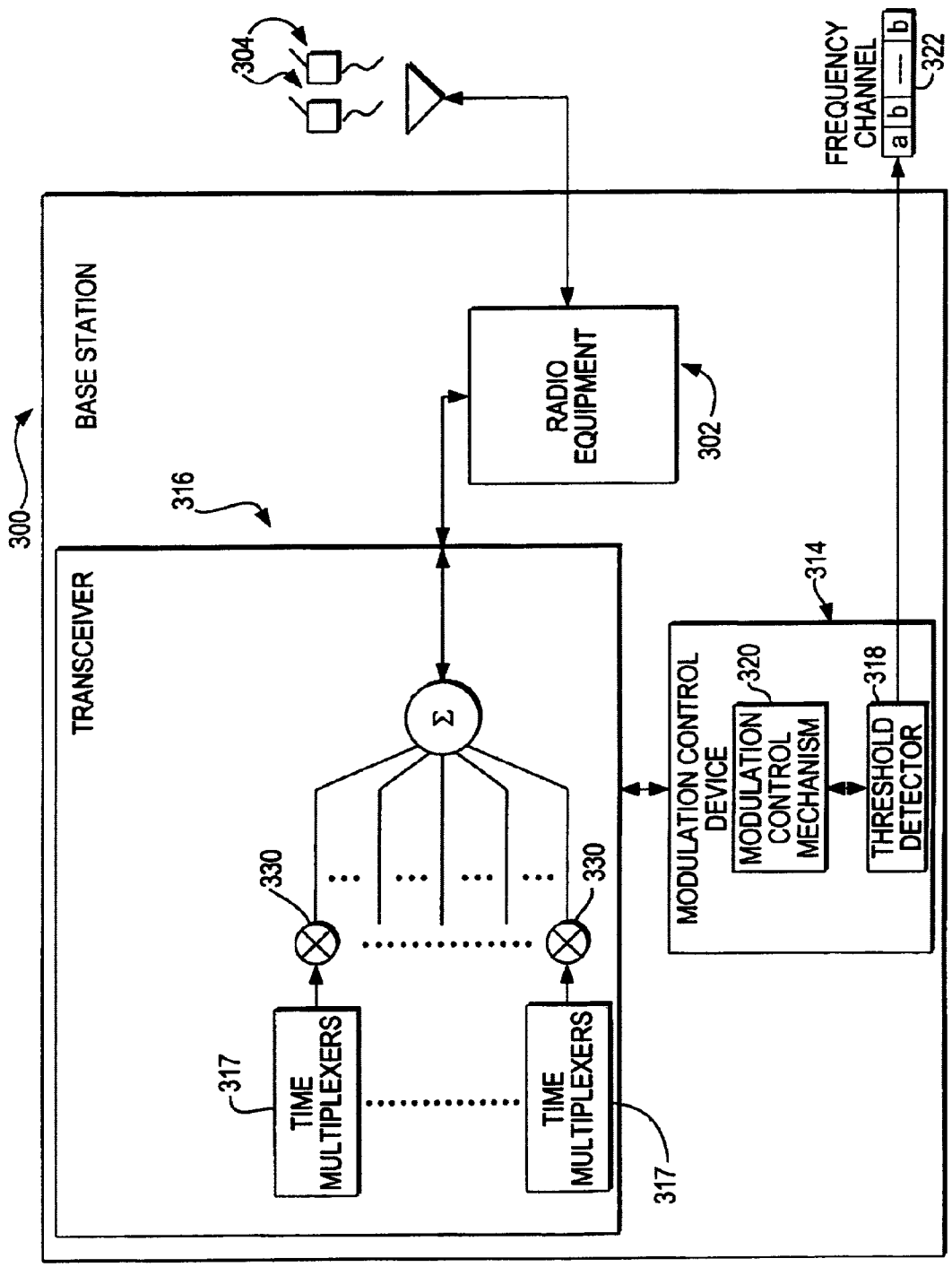
FIG. 6 is a schematic block diagram illustrating a base station for a Time Division Multiple Access wireless communication network in accordance with an embodiment of the present invention.

Now referring to FIG. 6, illustrated is one embodiment for implementing a base station 300 in accordance with the present invention. This embodiment comprises a base station 300 which includes radio equipment 302 for interfacing with at least one mobile unit 304.

The base station 300 further includes a modulation control device 314 and a transceiver 316 where the modulation control device 314 is communicatively connected to the transceiver 316. The transceiver includes a plurality of time multiplexers 317 to implement timeslots.

The modulation control device 314 comprises a threshold detector 318 and a modulation control mechanism 320. The threshold detector 318 is configured to measure the transmission quality (the signal quality and noise) of a plurality of frequency channels 322 during a plurality of timeslots and to deliver these measurements to the modulation control mechanism 320.

This implementation begins with a first mobile unit 304 requesting initial service from the base station 300 for a call. The modulation control mechanism 320 compares the transmission quality measurements, taken by the threshold detector 318, of a first frequency channel 322 during a first timeslot with a predetermined threshold level. If the measured transmission quality of the first frequency channel 322 during the first timeslot is greater than the predetermined threshold level, then the modulation control mechanism 320 assigns the frequency channel 322, the timeslot, and a phase adjustment value to the call of the mobile unit 304, and retains these assignment parameters (i.e., the phase adjustment value and the identity of the frequency channel 322 and timeslot to which the call was assigned). Otherwise, the modulation control mechanism 320 compares the transmission quality of a second timeslot of the first frequency channel 322 with the predetermined threshold level. If the measured transmission quality of the second timeslot of the first frequency channel 322 is greater than the predetermined threshold level, then the modulation control mechanism 320 assigns the second timeslot of the first frequency channel 322 and a phase adjustment value to the call of the mobile unit 304 as shown above. If not, then the modulation control mechanism 320 will continue through the plurality of timeslots within the plurality of frequency channels 322 until the call can be assigned to a timeslot within a frequency channel 322 (i.e., until a frequency channel's measurements during a timeslot exceed the predetermined level).

Once a last timeslot of the plurality of timeslots for the frequency channel 322 has been reached, the modulation control mechanism 320 will evaluate the first timeslot of the next frequency channel 322 of the plurality of frequency channels 322 and will continue through the plurality of timeslots and the plurality of frequency channels 322 until the call of the mobile unit 304 can be assigned to a timeslot and a frequency channel 322.

Once a last timeslot of a plurality of timeslots in a last frequency channel 322 of the plurality of frequency channels 322 has been reached, the modulation control mechanism 320 returns to the first timeslot of the first frequency channel 322 of the plurality of frequency channels 322 and increments the phase adjustment value to the next value and continues searching for an available timeslot. Once a last timeslot of a plurality of timeslots in a last frequency channel 322 of the plurality of frequency channels 322 has been reached and the last phase adjustment value of a plurality of such values has been reached, the modulation control mechanism 320 returns to the first timeslot of the first frequency channel 322 and resets the phase adjustment value to the first phase adjustment value and then continues searching for an available timeslot within a frequency channel 322.

When any subsequent mobile unit 304 requests service from the base station 300, the modulation control mechanism 320 identifies a frequency channel, timeslot, and phase adjustment value in substantially the same manner as above except that the modulation control mechanism 320 begins with the phase adjustment value of the previous assigned call and with a next timeslot of the frequency channel 322 to which the previous call was assigned.

Once the timeslot, the frequency channel 322, and the phase adjustment value has been assigned to the call of the mobile unit 304, these timeslot, frequency channel 322, and phase adjustment value parameters may be communicated to the mobile unit 304 over the control channel, as is well known in the art.

When the base station 300 is transmitting to the first mobile unit 304, he modulation control mechanism 320 may communicate with the transceiver 316, wherein the transceiver 316 may include a plurality of modulators/demodulators 330. The modulation control mechanism 320 may communicate the timeslot, the frequency channel, and phase adjustment value for a call of the first mobile unit 304 to the transceiver 316 so that the transceiver's modulator/demodulator 330 may modulate the call based on the phase adjustment value.

Let $A(t)\cos(2\pi(\text{frequency channel assigned}(t)) + \phi_i + \text{phase adjustment value})$ represent the waveform produced by at least one of the plurality of modulators/demodulators 330 where (p represents the variable to control the information encoding for π/4-DQPSK and i represents the timeslot for which the call was assigned to transmit and/or receive. The waveform illustrates the phase division of an information carrying signal on a frequency channel during a timeslot. Note that for each additional phase adjustment value utilized an additional modulators/demodulators may be required for each frequency channel.

Figure 6A:
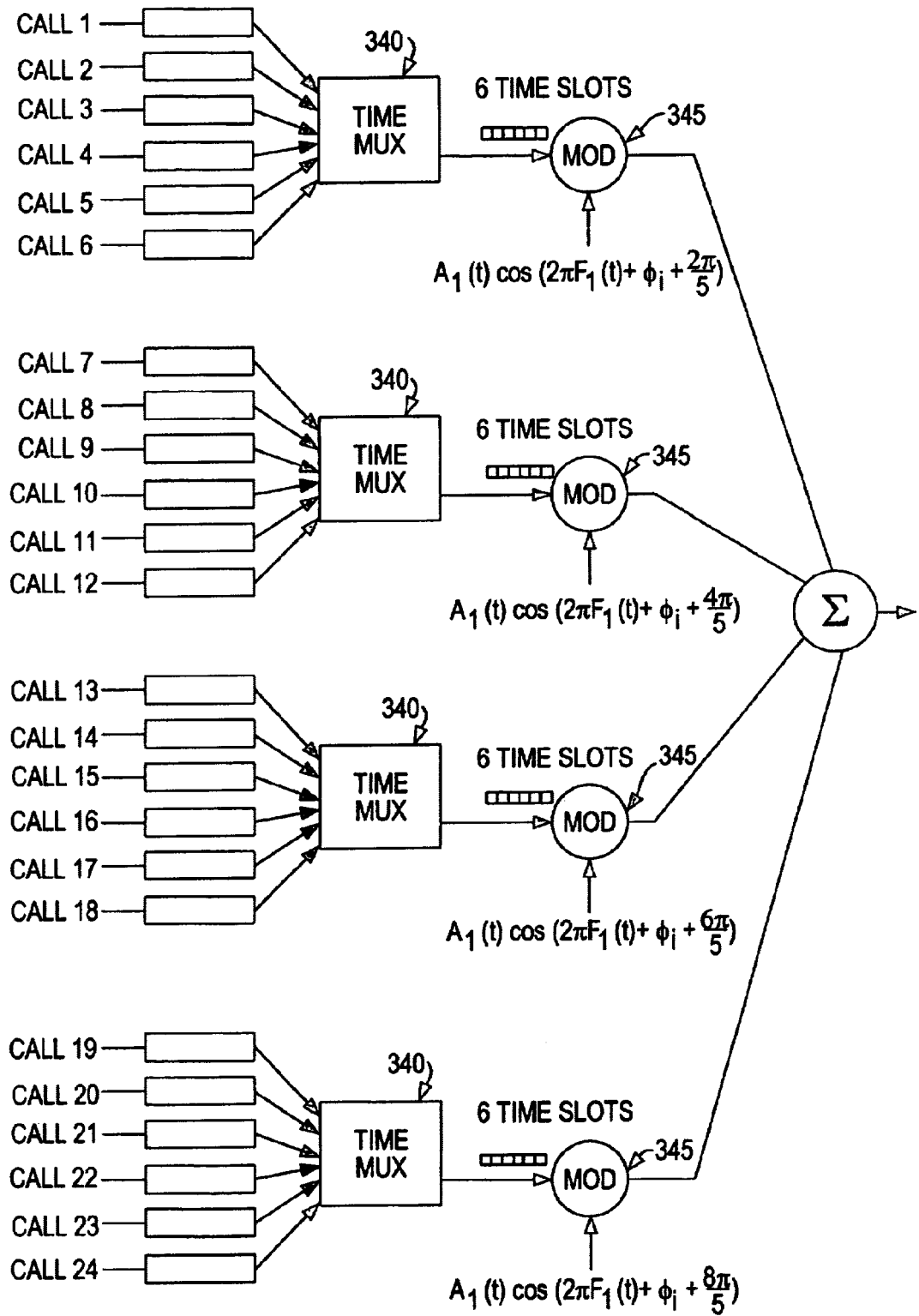
FIG. 6A is a functional diagram illustrating four level phase division for a frequency channel for a Time Division Multiple Access wireless communication network in accordance with an embodiment of the present invention.

As well known in the art, a traditional IS-54/IS-136 TDMA system uses a time multiplexer to create timeslots for a frequency channel thereby allowing for capacity for six calls. FIG. 6A illustrates the functional aspects of the phase division of a single frequency channel in a TDMA network in accordance with an embodiment of the present invention wherein four level phase division (i.e., four distinct phase adjustment values; P=4) has been chosen. Four level phase division may require additional time multiplexers 340 (illustrated is an additional time mutliplexer 340 for each phase adjustment value) to create timeslots for each phase adjustment value. As illustrated in this embodiment, a time multiplexer 340 and a modulator 345 are shown for each phase adjustment value assigned. This implementation allows for twenty-fiur calls to share a single frequency channel. Four calls, that are assigned different phase adjustment values, share the same timeslot within this single frequency channel.

Alternatively, the modulation control device 314 may interact with the base station controller 26 to accomplish the phase adjustment value modulation so that the mobile unit 304 can identify the transmission (i.e., the mobile unit 304 can retrieve the transmission by demodulating with the assigned phase adjustment value). Yet another alternative is that the modulation control device 314 may communicate with a modulator/demodulator that is independent of the transceiver 316 to modulate the call with the phase adjustment value for the mobile unit 304. Additional modulators/demodulators to modulate the call with the associated phase adjustment value and additional time multiplexers can be added to existing base stations 300 to facilitate the implementation of this embodiment of the present invention.

When the base station 300 receives a transmission during a call from a mobile unit 304, the transceiver 316 may communicate with the modulation control mechanism 320 to allow identification of the mobile unit 304. After the received transmission during the call is demodulated, the modulation control mechanism 320 may compare the phase of the transmission with the assigned phase adjustment values to identify the mobile unit 304 that made the transmission.

Figure 7:
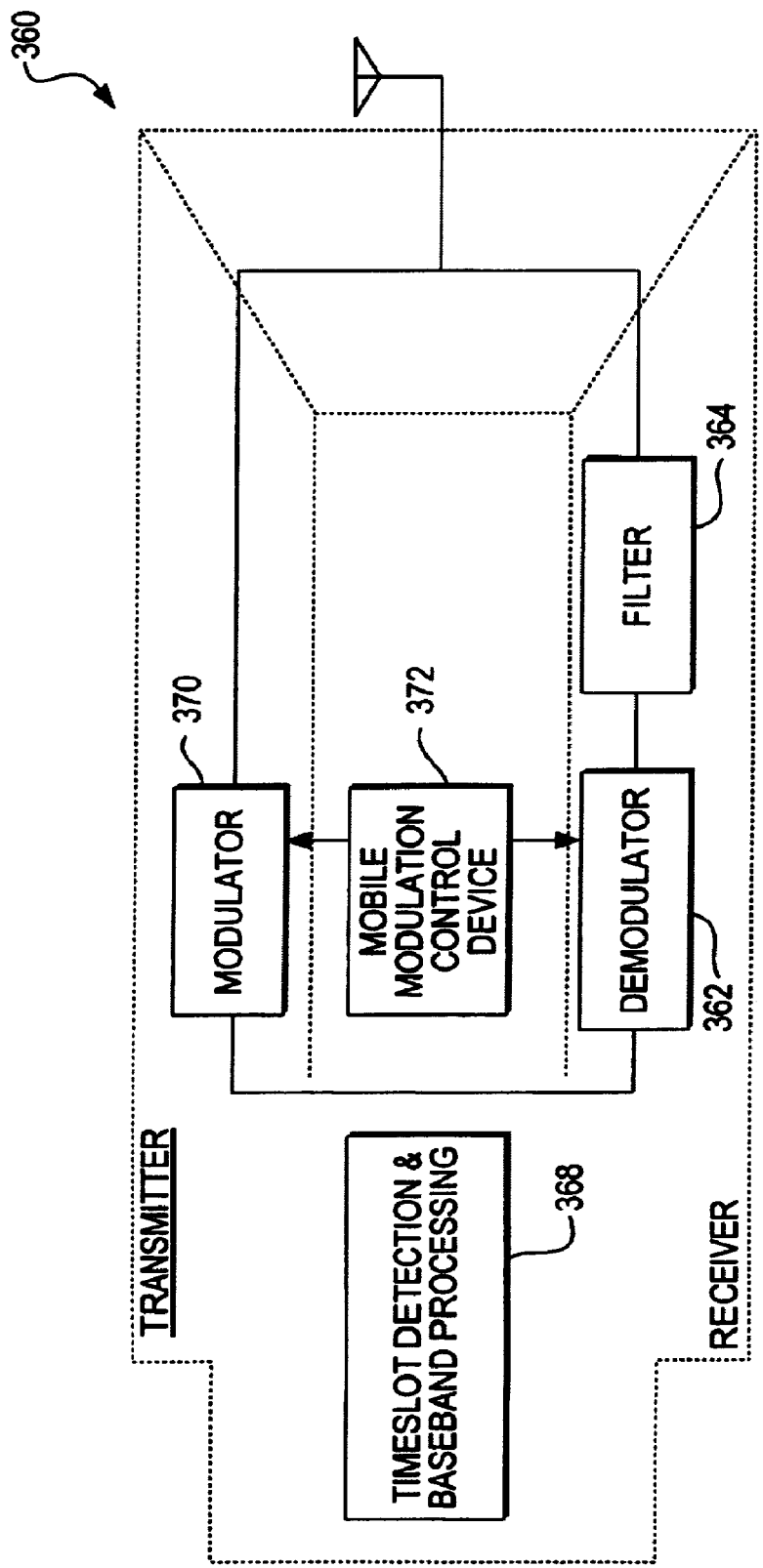
FIG. 7 is a schematic block diagram illustrating a mobile unit for a Time Division Multiple Access wireless communication network in accordance with an embodiment of the present invention.

FIG. 7 illustrates some of the elements of a mobile unit 360 for use in accordance with an embodiment of the present invention. The mobile unit 360 includes a demodulator 362, a filter 364, a timeslot detector/multiplexer 368 for isolating the assigned timeslot, a modulator 370, and a mobile modulation control device 372. When the mobile unit 360 receives the assigned frequency channel 322, timeslot, and phase adjustment value from the base station 300 for the call, these values are retained by the mobile modulation control device 372 for the duration of the call. When the mobile unit 360 receives a transmission from the base station 300 the mobile modulation control device 372 communicates the assigned phase adjustment value to the demodulator 362. Therefore, the transmission from the base station 300 can be demodulated using the assigned phase adjustment value. The demodulator's 362 output may then be passed to the filter 364 to remove the noise and retrieve the desired transmission from the base station 300 for the call. When the mobile unit 360 wishes to transmit, the mobile modulation control device 372 may communicate the assigned phase adjustment value, frequency channel 322, and timeslot to the modulator 370. Accordingly, the mobile unit 360 transmits with the assigned phase adjustment value which allows the base station 300 to identify which mobile unit 304 made the transmission and accordingly to which call the transmission belongs.

Figure 8:
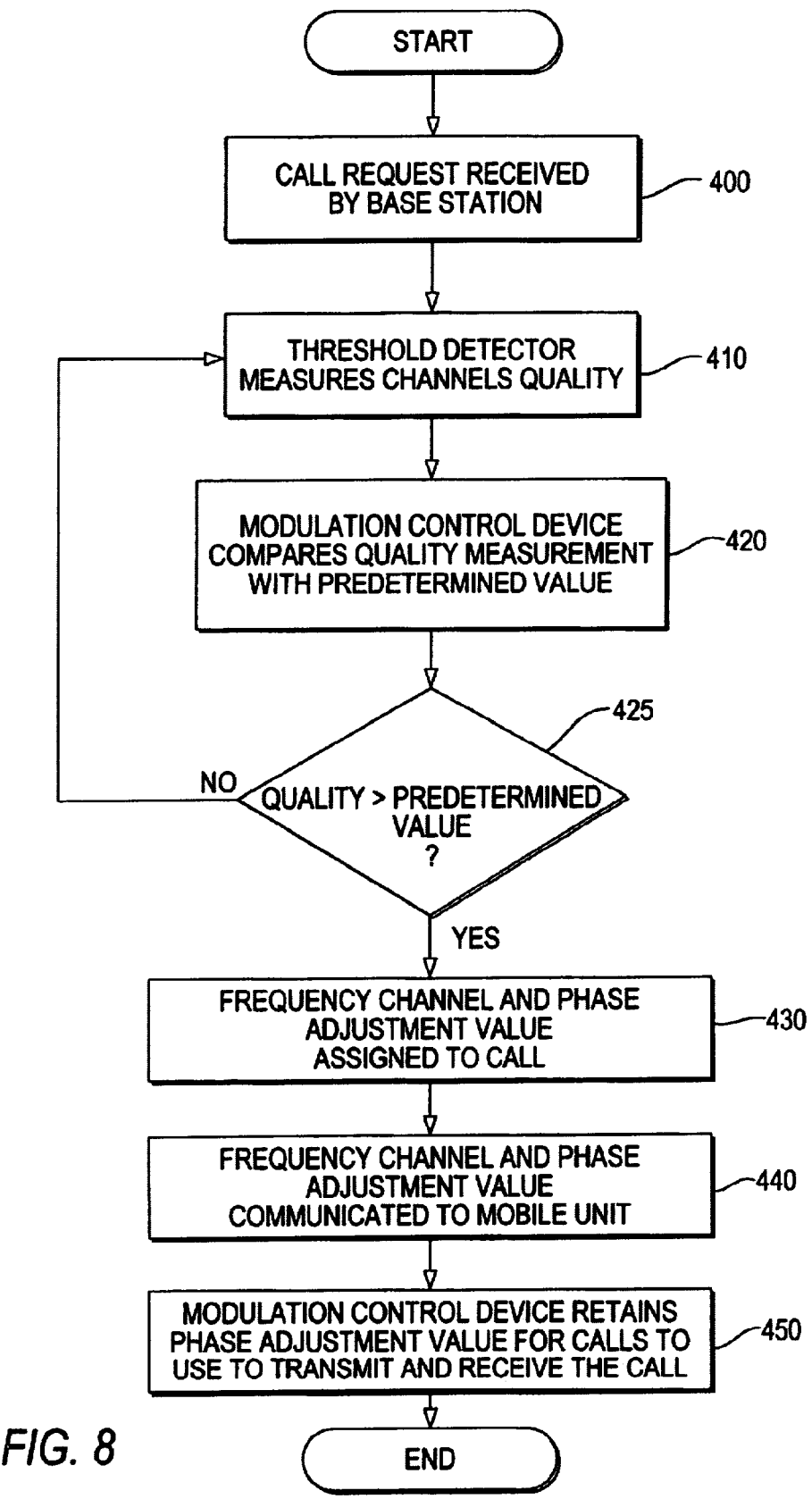
FIG. 8 is a flowchart of the operation of a wireless base station in accordance with an embodiment of the present invention.

III. Operation of a Modulation Control Device According to the Present Invention The operation of a wireless base station in accordance with an embodiment of the present invention is illustrated by FIG. 8. A base station in a wireless communication network begins the search for a frequency channel for a call when a mobile unit first requests service at block 400. The transmission quality of a first frequency channel is then measured by the threshold detector at block 410. The modulation control device then compares the transmission quality measurement of the frequency channel with a predetermined value at block 420. The decision block 425, if the transmission quality measurement of the frequency channel exceeds the predetermined value, then the modulation control device assigns the frequency channel and the phase adjustment value to the call, as indicated at block 430. However, as the decision block 425 illustrates, if the transmission quality measurement of the frequency channel does not exceed the predetermined value, then the modulation control device compares the transmission quality measurement received from the threshold detector of the next frequency channel with a predetermined value at block 420.

After the call has been assigned a frequency channel and a phase adjustment value, as indicated at block 430, then the phase adjustment value is communicated to a mobile unit that is associated with the call at block 440. The modulation control device then associates the assigned phase adjustment value with the call so that the phase adjustment value can be added during modulation for communicating with the mobile unit or referenced by the base station during reception to attribute the call to a mobile unit at block 450.

Note that the operation of the modulation control device is similar for a TDMA network. In a TDMA network, the modulation control device examines each timeslot within the plurality of frequency channels. The modulation control device examines a first timeslot within the first frequency channel and if the frequency channel for that timeslot is unacceptable, the modulation control device continues searching the rest of the timeslots within the first frequency channel until an acceptable transmission quality measurement is found. The modulation control device continues to the first timeslot in a second frequency channel if no transmission quality measurement is found acceptable for any timeslot within the first frequency channel. The modulation control device will step through the timeslots in the second channel until the frequency channel has an acceptable transmission quality measurement for a timeslot. This searching continues through the plurality of timeslots in the plurality of frequency channels until a timeslot within a frequency channel is found to be acceptable. The methodology for assigning and communicating the phase adjustment value is then followed as above.

Figure 9:
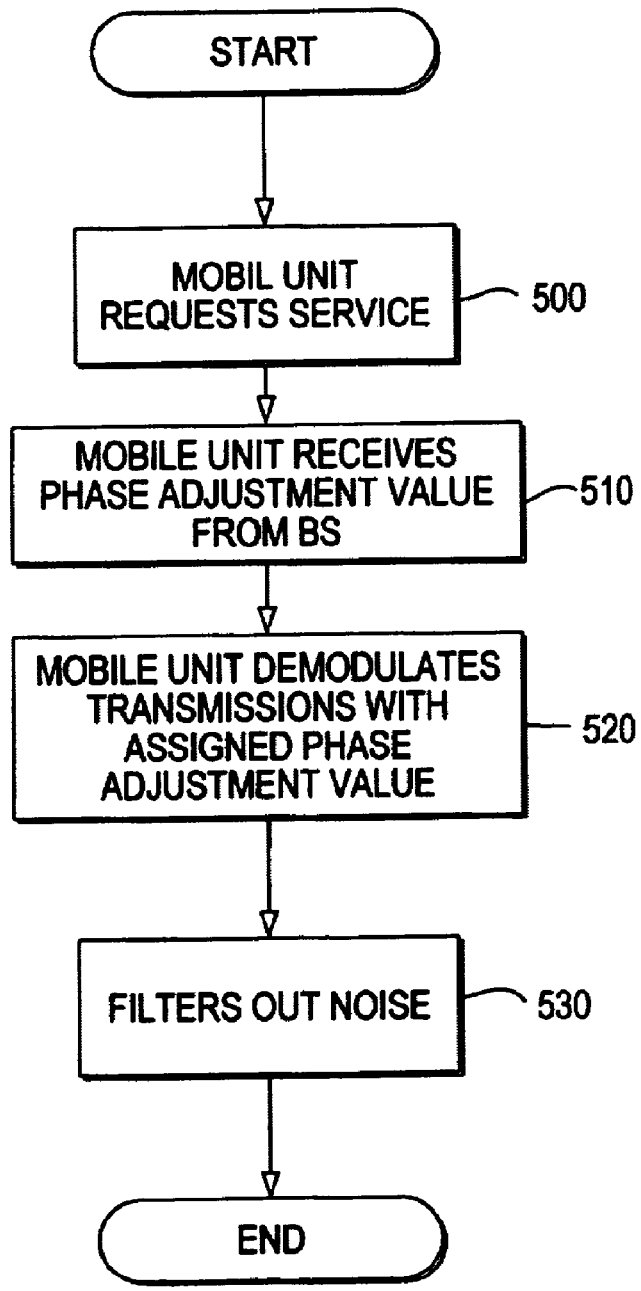
FIG. 9 is a flowchart of the operation of a wireless mobile unit in accordance with an embodiment of the present invention.

The operation of a wireless mobile unit in accordance with an embodiment of the present invention is illustrated by FIG. 9. The operation of the mobile unit begins when the mobile unit requests service from the base station, as indicated at block 500. The mobile unit will then receive the assigned phase adjustment value from the base station preferably over the control channel, as indicated at block 510. The mobile unit will then demodulate received transmissions and modulate the outgoing transmissions with the assigned phase adjustment value, as indicated at block 520. The mobile unit then may filter out unwanted noise as indicated in block 530.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A system for increasing the capacity of a wireless communication network, comprising:
   a modulation control device that assigns a modulation parameter to a call of a mobile which is using one of a plurality of frequency channels wherein the modulation control device uses at least the modulation parameter to modulate the call and uses the modulation parameter to identify the call, the mobile and the frequency channel.

2. The system in claim 1, wherein the wireless communication network comprises an advanced mobile phone system (AMPS) network.

3. The system in claim 1, wherein the modulation parameter assigned to the call is a phase adjustment value and other modulation parameters include timeslot and frequency.

4. The system in claim 3, wherein the wireless communication network comprises a time division multiple access wireless network.

5. The system in claim 3, wherein the wireless communications network comprises a time division multiple access personal communications system (PCS) network.

6. The system in claim 3, wherein the wireless communications network comprises a time division multiple access global system for mobile communications (GSM) network.

7. The system of claim 1, wherein the modulation control device selects a next available frequency channel based on a frequency channel quality measurement of a threshold detector, and selects a modulation parameter, whereby the call is assigned to the next available frequency channel using the selected modulation parameter.

8. The system of claim 7, wherein the modulation control device calculates the modulation parameter to assign to the frequency channel.

9. The system of claim 7, wherein the modulation control device stores a plurality of modulation parameters.

10. The system of claim 7, wherein the modulation control device selects the modulation parameter that substantially distinguished different calls on a single frequency channel.

11. The system of claim 7, wherein the modulation control device selects the modulation parameter that provides a unique resultant modulation parameter value for the call on the frequency channel.

12. The system of claim 1, wherein the modulation control device is coupled to a wireless transceiver that assigns the call to one of a plurality of wireless frequency channels.

13. The system of claim 1, wherein the modulation parameter is a phase adjustment value.

14. The system of claim 13, wherein the modulation control device receives the phase adjustment value over the wireless communication network, and provides the phase adjustment value to a transceiver for call retrieval during demodulation and for modulation during transmission.

15. A method for increasing the capacity of a wireless communication network, the method comprising:
assigning a modulation parameter to a call of a mobile which is using one of a plurality of frequency channels of the communication network wherein the modulation parameter identifies the call, the mobile and the frequency channel.

16. The method of claim 15, further comprising:
communicating the modulation parameter to a mobile unit that is associated with the call; and
associating the modulation parameter with the call so that the modulation parameter can be used for transmitting the call and referenced for receiving the call.

17. The method of claim 15, further comprising:
measuring a transmission quality of the frequency channels individually; and
evaluating the transmission quality of each frequency channel until a first frequency channel having a suitable transmission quality is identified.

18. The method of claim 17 further comprising the step of associating the modulation parameter with the call so that the modulation parameter can be used for transmitting the call and referenced for receiving the call.

19. The method of claim 17 wherein the evaluating step comprises comparing the transmission quality of the frequency channel to a value until the transmission quality exceeds the value.

20. The method of claim 15 further comprising the step of associating the modulation parameter with the call so that the modulation parameter can be used for transmitting the call and referenced for receiving the call.

21. The method of claim 15, further comprising:
receiving a modulation parameter that identifies, at least in part, a first call received on a frequency channel; and
demodulating the first call on the frequency channel utilizing the modulation parameter.

22. The method of claim 21 further comprising the step of filtering out noise.

23. The method of claim 15, further comprising:
receiving a modulation parameter that identifies, at least in part, a first call of a mobile unit within a communications channel of a wireless communication network; and
modulating the call utilizing the modulation parameter value.

24. The method of claim 15, wherein the modulation parameter is a phase adjustment value.

25. The method of claim 15, further comprising:
measuring a transmission quality of the frequency channels individually during each of a plurality of timeslots, each the plurality of timeslots are associated with a frequency channel; and
evaluating the transmission quality of each frequency channel during each timeslot until a first frequency channel having a suitable transmission quality is identified.

26. The method of claim 25 wherein the evaluating step comprises comparing the transmission quality of the frequency channel during each timeslot to a value until the transmission quality exceeds the value.

* * * * *